United States Patent
Harris et al.

(10) Patent No.: US 9,031,151 B1
(45) Date of Patent: May 12, 2015

(54) RECEIVING AND RESOLVING A COMPOSITE ORBITAL ANGULAR MOMENTUM BEAM

(71) Applicant: L-3 Communications Corp., New York, NY (US)

(72) Inventors: Johnny M. Harris, Layton, UT (US); Zachary C. Bagley, Salt Lake City, UT (US); Brandon G. Walsh, Syracuse, UT (US); Jonathan C. Landon, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 0 days.

(21) Appl. No.: 14/272,213

(22) Filed: May 7, 2014

(51) Int. Cl.
| *H04B 7/02* | (2006.01) |
| *H04L 1/02* | (2006.01) |
| *H04B 7/08* | (2006.01) |
| *H04B 7/06* | (2006.01) |

(52) U.S. Cl.
CPC ............... *H04B 7/08* (2013.01); *H04B 7/0617* (2013.01)

(58) Field of Classification Search
CPC ..... H04L 1/0618; H04L 1/06; H04L 27/2647; H04B 7/0417; H04B 7/0845; H04B 7/0617; H04B 7/0669
See application file for complete search history.

(56) References Cited

U.S. PATENT DOCUMENTS

| 6,473,467 | B1 * | 10/2002 | Wallace et al. | 375/267 |
| 7,471,742 | B2 * | 12/2008 | Hammons, Jr. | 375/299 |
| 2010/0013696 | A1 | 1/2010 | Schmitt et al. | |
| 2011/0150464 | A1 | 6/2011 | Murshid et al. | |
| 2012/0212375 | A1 * | 8/2012 | Depree, IV | 343/700 MS |
| 2012/0319915 | A1 | 12/2012 | Roh et al. | |
| 2013/0027774 | A1 | 1/2013 | Bovino et al. | |
| 2013/0106664 | A1 | 5/2013 | Igwe | |
| 2013/0121330 | A1 | 5/2013 | Ashrafi | |
| 2013/0235744 | A1 | 9/2013 | Chen et al. | |

OTHER PUBLICATIONS

U.S. Appl. No. 14/077,433, filed Nov. 12, 2013, L-3 Communications Corp.
U.S. Appl. No. 14/077,493, filed Nov. 12, 2013, L-3 Communications Corp.
Ashmawy et al., "Joint MCMA and DD blind equalization algorithm with variable-step size," IEEE (2009), pp. 174-177.
Edfors et al., "Is Orbital Angular Momentum (OAM) Based Radio Communications an Unexploited Area?," IEEE (2011), pp. 1-7.
Hung et al., "A Hybrid Variable Step-Size Adaptive Blind Equalization Algorithm for QAM Signals," IEEE Globecom 2005, pp. 2140-2144.

(Continued)

*Primary Examiner* — Ted Wang
(74) *Attorney, Agent, or Firm* — Kirton McConkie

(57) ABSTRACT

A transmit antenna or antennas can be configured to transmit a composite orbital angular momentum (OAM) radio frequency (RF) beam comprising a plurality of individual OAM RF signals each having a different OAM mode. An array of antennas for receiving and resolving the composite OAM beam into the individual OAM signals can be located entirely within a relatively small sector of a far field pattern of the composite OAM beam. A processing module connected to the antennas of the receive array can resolve the composite OAM beam into its individual OAM signals using angular resolution. The transmit antenna can transmit the individual OAM signals—and thus the composite OAM beam—as full OAM signals or partial-beam OAM signals.

31 Claims, 7 Drawing Sheets

(56) References Cited

OTHER PUBLICATIONS

Hung et al., "Variable-Step-Size Multimodulus Blind Decision—Feedback Equalization for High-Order QAM Based on Boundary MSE Estimation," ICASSP 2004 (IEEE 2004), pp. 881-884.

Lundin, "Interference and Energy Conservation in Phased Antenna Arrays and Young's Double Slit Experiment," (Dec. 12, 2012), pp. 1-45.

Mohammadi et al., "Orbital Angular Momentum in Radio—A System Study," IEEE Transactions on Antennas and Propagation, (publication date unknown but prior to Sep. 30, 2013), pp. 1-7.

Wei et al., "A Variable Step Size Blind Equalization Algorithm for QAM Signals," ICMMT 2010 Proceedings (IEEE 2010), pp. 1801-1804.

* cited by examiner

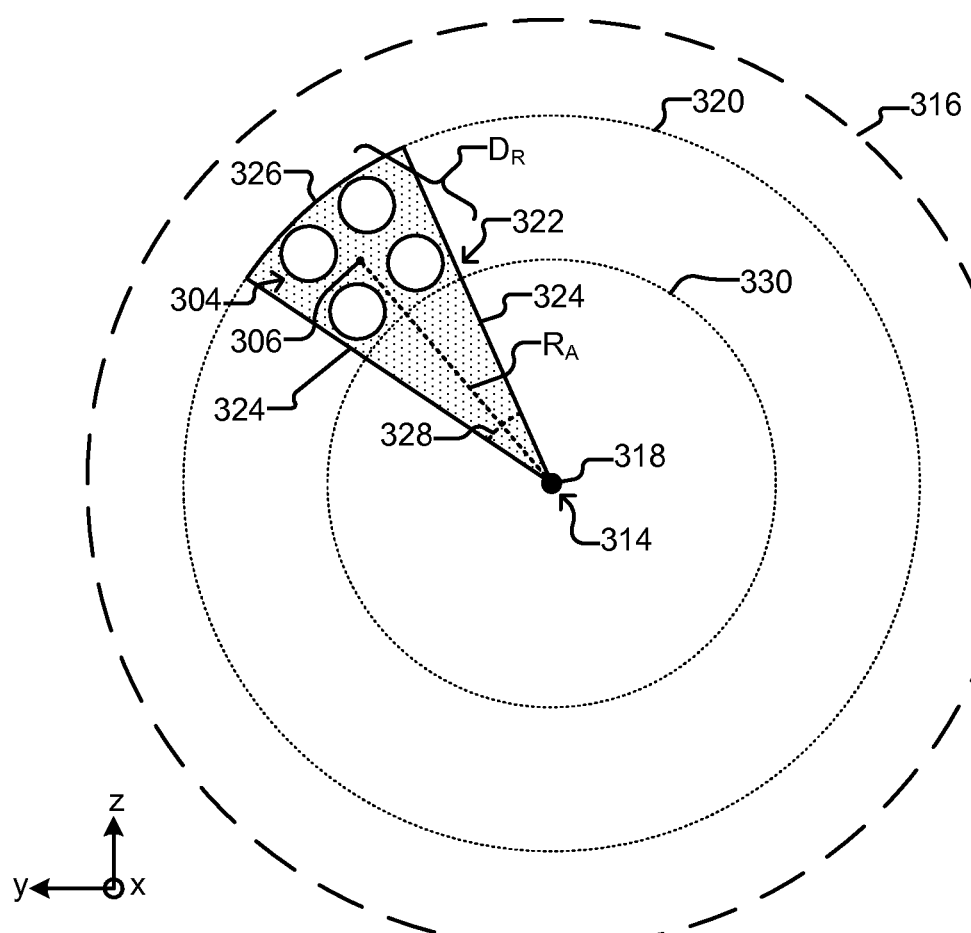

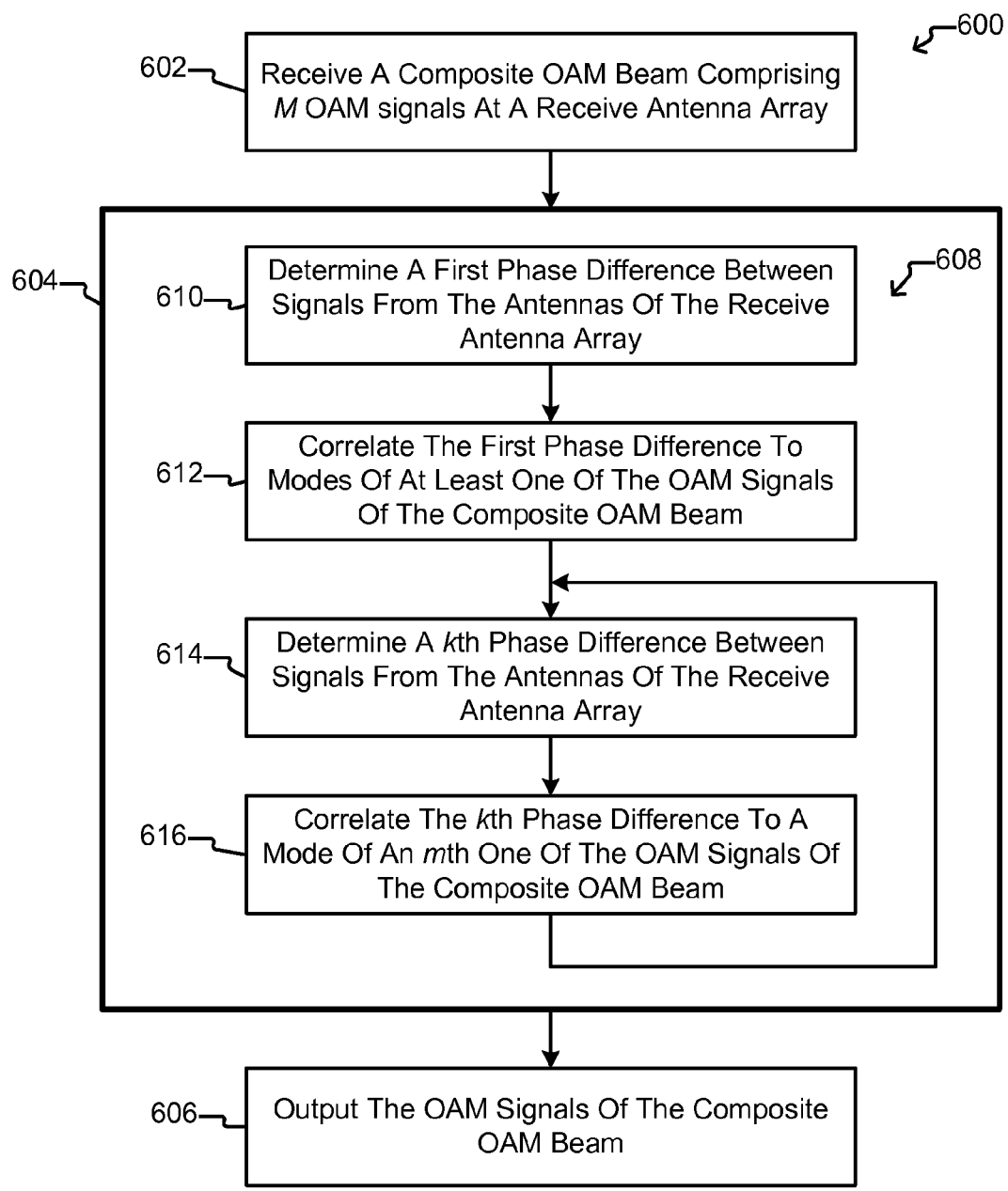

RECEIVING AND RESOLVING A COMPOSITE ORBITAL ANGULAR MOMENTUM BEAM

BACKGROUND

Increasing the transmission data rate in a radio frequency (RF) communications system is typically desirable. The ability to simultaneously transmit multiple RF communications signals in multiple data channels in the same frequency band is one method of increasing the transmission data rate. FIG. 1 illustrates a transmit antenna array 102 and a receive antenna array 104 of a multiple input multiple output (MIMO) communications system 100. A MIMO system like system 100 utilizes the spatial separation of the antennas in the transmit array 102 and the receive array 104 to separate the data channels.

RF signals spread out as they propagate. Thus, multiple RF signals transmitted by the spatially separated antennas in the transmit array 102 will eventually overlap and interfere with each other sufficiently to make it difficult or impossible to separate the signals at the receive array 104. For a given intensity level of the transmitted RF signals from the transmit array 102, the maximum permissible distance between the transmit antenna array 102 and the receive antenna array 104 in which a MIMO communications systems 100 can resolve with relative certainty the transmitted RF signals is often termed the Rayleigh range R and is equal to the product of the distance across (e.g., the diameter of) $D_T$ the transmit antenna array 102 and the distance across (e.g., the diameter of) $D_R$ the receive array 104 divided by the wavelength $\lambda$ of the center frequency of the frequency band in which the transmit array 102 antennas are transmitting. That is: $R=(D_T*D_R)/\lambda$. For example, all adjacent antennas in the transmit array 102 can be spaced a uniform distance apart in both the y and z directions in FIG. 1, where the distance D between the transmit array 102 and the receive array is in the x direction. As noted, the distance D should be less than or equal to the Rayleigh range R.

Although a MIMO communications system 100 can provide multiple channels for transmission of multiple RF signals in the same frequency band, the number of channels is limited to the number of antennas in the transmit array 102 for which there is a corresponding antenna in the receive array 104. Moreover, the distance D between the transmit array 102 must be less than the Rayleigh range R.

As is known, orbital angular momentum (OAM) can be imparted to RF signals, and RF signals in the same frequency band but with different OAM modes can be combined and transmitted as a composite OAM beam to a receiver, where the different OAM modes of the individual RF signals can be detected and the RF signals separated from the composite beam. FIG. 2 illustrates an example of a composite beam 200 comprising a first OAM signal 204 with a first OAM mode and a second OAM signal 214 with a second OAM mode.

As also known, an OAM signal 204, 214 turns (i.e., twists) about an axis 202 in the direction of propagation of the signal. For example, the wave front of the signal 204, 214 can be substantially spiral or helical. The numerical value of the OAM mode of such signals corresponds to the time or distance 206, 216 between one full revolution of the signal 204, 214 about the axis 202, and the sign of the OAM mode corresponds to the direction (e.g., right or left) of the revolutions of the signal 204, 214 about the axis 202.

Some embodiments of the present invention provide improvements in receiving and separating the OAM signals of a composite OAM beam.

SUMMARY

In some embodiments, a process for resolving a composite orbital angular momentum (OAM) beam comprising multiple OAM signals each having a different one of a plurality of unique OAM modes can include receiving at an antenna array comprising a plurality of receive antennas the composite OAM beam propagating along an axis. The antenna array can be located a distance $R_A$ from the axis. The process can further include separating the OAM beam into the OAM signals utilizing a first phase difference of the composite OAM beam as received at ones of the receive antennas.

In some embodiments, an orbital angular momentum (OAM) communications system can include a transmit antenna, a receive antenna array, and a signal separator. The transmit antenna can be configured to transmit along a propagation axis at least one OAM signal of a composite OAM beam comprising M OAM signals, and each of the OAM signals can have a different one of a plurality of unique OAM modes. The receive antenna array can include at least $N_{RA}$ receive antennas, and the antenna array can be disposed a distance $R_A$ from the propagation axis. The signal separator can be configured to receive input signals from the receive antennas and separate the OAM beam into the OAM signals utilizing phase differences between ones of the input signals.

BRIEF DESCRIPTION OF THE DRAWINGS

FIG. 3B shows the receive antenna array in a far field of a composite OAM beam transmitted by the OAM transmit antenna of FIG. 3A according to some embodiments of the invention.

FIG. 6 is an example of a process for receiving and resolving a composite OAM beam into its individual OAM signals according to some embodiments of the invention.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on,"

"attached to," or "coupled to" are used herein, one element (e.g., a material, a layer, a substrate, etc.) can be "on," "attached to," or "coupled to" another element regardless of whether the one element is directly on, attached to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

The meanings of the following symbols, when used in mathematical formulas, are: + means mathematical addition, − means mathematical subtraction, * means mathematical multiplication, and / means mathematical division.

As used herein, "substantially" means sufficient to work for the intended purpose. As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

"OAM" means orbital angular momentum, and an "OAM signal" is a radio frequency (RF) signal that has non-zero OAM. An RF signal with non-zero OAM turns or twists about an axis as the RF signal propagates along the axis. The "mode" of an OAM signal is a number the absolute value of which corresponds to the time or distance traveled along the axis as the signal makes one complete revolution about the axis. The sign of the mode indicates which direction the RF signal twists around the axis. A "composite OAM beam" is an RF beam that comprises multiple OAM signals each with a different OAM mode. A "sector" of a circle is a region of the circle bounded by two radii of the circle and the arc of the circle between the radii.

Figure 1:
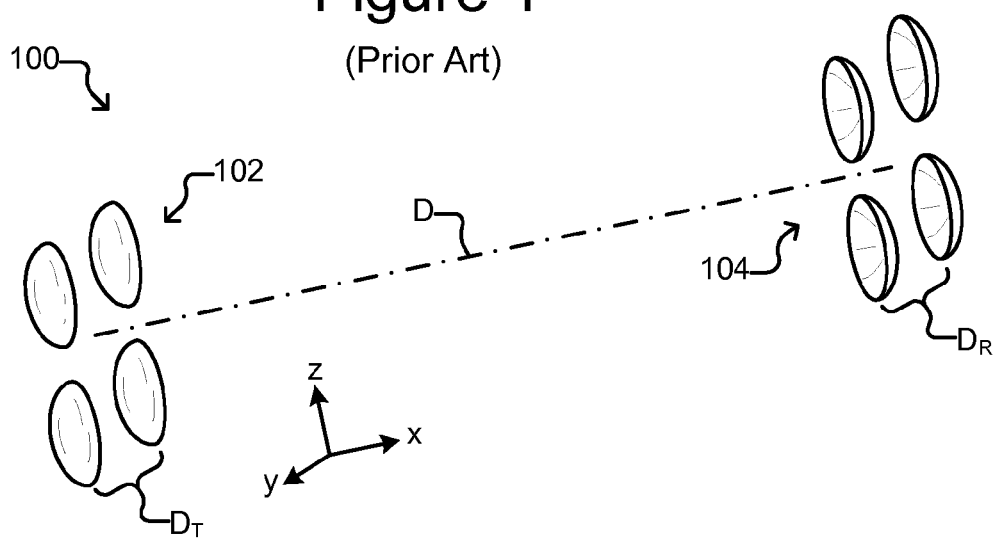
FIG. 1 illustrates an example of a prior art multiple input multiple output communications system.
Figure 2:
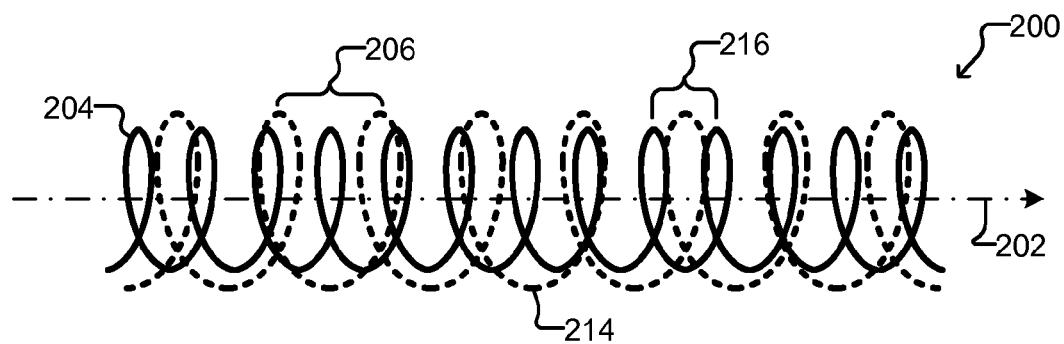
FIG. 2 is an example of a composite OAM beam comprising multiple individual OAM RF signals.
Figure 3A:
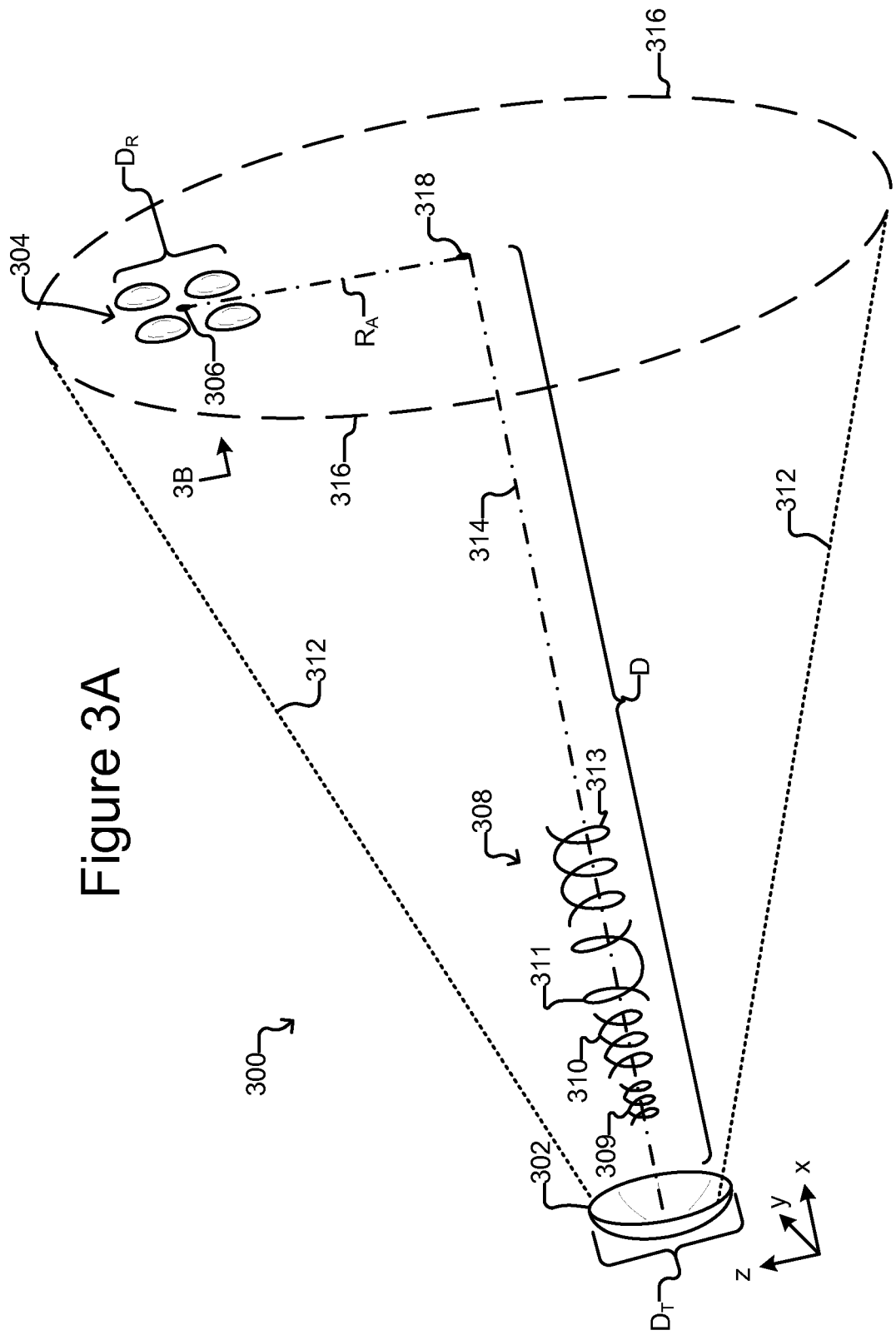
FIG. 3A illustrates an example of an OAM transmit antenna and a receive antenna array of an OAM communications system according to some embodiments of the invention.

FIG. 3A illustrates examples of a radio frequency (RF) OAM transmit antenna 302 and an array 304 of RF receive antennas of an OAM communications system 300. Although not shown, an RF transmitter can drive RF signals to the transmit antenna 302, and an RF receiver (not shown) can be connected to the receive antenna array 304. Also, the transmit antenna 302 can comprise multiple antennas.

The OAM transmit antenna 302 can be configured to transmit a composite OAM beam 308 comprising M individual OAM signals 309, 310, 311, 313 in the same frequency band, where M is an integer greater than one. Thus, although the OAM beam 308 is illustrated in FIG. 3A as comprising four individual OAM signals 309, 310, 311, 313, the OAM beam 308 can comprise fewer or more of such individual OAM signals. Each individual OAM signal 309, 310, 311, 313 can be a modulated RF signal carrying data, and each individual OAM signal 309, 310, 311, 313 can have a different OAM mode. For example, the mode of each individual OAM signal 309, 310, 311, 313 can be a unique integer (e.g., no two of the modes of the M individual OAM signals 309, 310, 311, 313 have the same absolute value and sign). M can thus also be the number of unique modes of the OAM signals 309, 310, 311, 313 in the composite OAM beam 308.

The transmit antenna 302 can be any type of antenna suitable for transmitting a composite OAM beam 308 comprising multiple OAM signals 309, 310, 311, 313. For example, the transmit antenna 302 can be like the antenna system 300 illustrated in FIG. 3 of U.S. patent application Ser. No. 14/077,493, which was filed Nov. 12, 2013 by the same assignee and applicant as the instant application. The entirety of the foregoing U.S. patent application Ser. No. 14/077,493 is incorporated herein by reference.

As another example, the transmit antenna 302 can comprise multiple transmit antennas (e.g., one for each of the M individual OAM signals 309, 310, 311, 313 in the composite OAM beam 308) each for transmitting one of the individual OAM signals 309, 310, 311, 313. For example, each such OAM transmit antenna can comprise an OAM shaped surface (i.e., a surface that imparts a non-zero OAM to an incident RF signal) such as the shape of the OAM shaped surface 302 in FIG. 3A of U.S. patent application Ser. No. 14/077,433, which was filed Nov. 12, 2013 by the same assignee and applicant as the instant application. The entirety of the foregoing U.S. patent application Ser. No. 14/077,433 is incorporated herein by reference. Each such OAM antenna can be pointed at (e.g., the bore sight of each antenna can be directed to) the center point 318 of a distant far field 316 in which the receive array 304 is located, which is discussed below. Although each individual OAM signal 309, 310, 311, 313 transmitted from each such OAM antenna will propagate and twist about its own propagation axis, as long as the distance D from the transmit antenna 302 to the receive array 304 is great, all of the individual OAM signals 309, 310, 311, 313 will effectively be traveling and twisting about a common propagation axis 314 at the far field 316 substantially as discussed below.

As OAM signals, each individual OAM signal 309, 310, 311, 313—and thus also the composite OAM beam 308—twists about a propagation axis 314 as the signal 309, 310, 311, 313 propagates along the axis 314. For example, as illustrated in FIG. 3A, the propagation axis 314 can be parallel to the x axis in an x, y, z coordinate system. As is known, RF signals, such as the composite OAM beam 308, spread out as they propagate. The spreading of the composite OAM beam 308 as it propagates along the axis 314 is illustrated, in exaggerated fashion, by 312 in FIG. 3A. An outline of a far field 316 of the composite OAM beam 308 in which the receive antenna array 304 is located (which is a distance D from the transmit antenna 302) is also shown in FIG. 3A. The far field 316 can be substantially perpendicular to the propagation axis 314. If the axis of propagation 314 is parallel to the x axis in an x, y, z coordinate system as shown, the far field 316 can be in a plane that is substantially parallel to the y, z plane. A substantially centrally located "center point" 318 can be the point in the far field 316 where the propagation axis 314 intersects the far field 316. Herein, any reference to distance in the far field 316 to or from the center point 318 is synonymous to distance to or from the propagation axis 314 (or 714 in FIG. 7A) at the point where the propagation axis 314 (or 714 in FIG. 7A) intersects the far field 316.

As noted above and illustrated in FIG. 3A, the receive antenna array 304 can be located generally in the far field 316. For example, the array 304 can be located a distance $R_A$ from the center point 318 of the far field 316. The distance $R_A$ can be, as illustrated in FIG. 3B, from the center point 318 of the far field 316 to a point 306 substantially at the center of the array 304. As an alternative example, the distance $R_A$ can be from the center point 318 to the antenna in the array 304 that is closest to the center point 318.

Regardless, as shown in FIG. 3B, the entirety of the receive antenna array 304—and thus all of the antennas of the array 304—can be located entirely within a sector 322 of a circle 320 centered at the center point 318 of the far field 316. The sector 322 can be bounded by two radii 324 and an arc 326 of the circle 320 between the two radii 324. The length of each radii 324 and the angle 328 between the radii 324 can be such that the sector 322 encompasses entirely the receive antenna array 304. For example, the length of each radii 324 can be greater than the distance from the center point 318 of the far field 316 to the farthest antenna in the receive array 304 from the center point 318. As shown in FIG. 3B, the entirety of the receive antenna array 304—and thus every antenna in the array 304—can also be outside of a second circle 330 centered at the center point 318 of the far field 316 and having a radius that is shorter than the length of each radii 324 and the distance $R_A$. For example, the radius of the second circle 330 can be less than the distance from the center point 318 to the closest antenna in the receive array 304 to the center point 318.

In some embodiments, the angle 328 between the radii 324 of the circle 320 can be less than one hundred eighty degrees, less than ninety degrees, less than forty-five degrees, or less than thirty degrees. In some embodiments, the area of the sector 322 can be less than half or less than a fourth of the area of the circle 320. At least some of the foregoing angle or area requirements can result in all of the receive antennas of the array 304 being located relatively close together, which can be an advantage as the size of the far field 316 can be large for large values of the distance D between the transmit antenna 302 and the receive array 304. Nevertheless, the foregoing numerical values and ranges of angles and areas are examples only and are not limiting.

Figure 4:
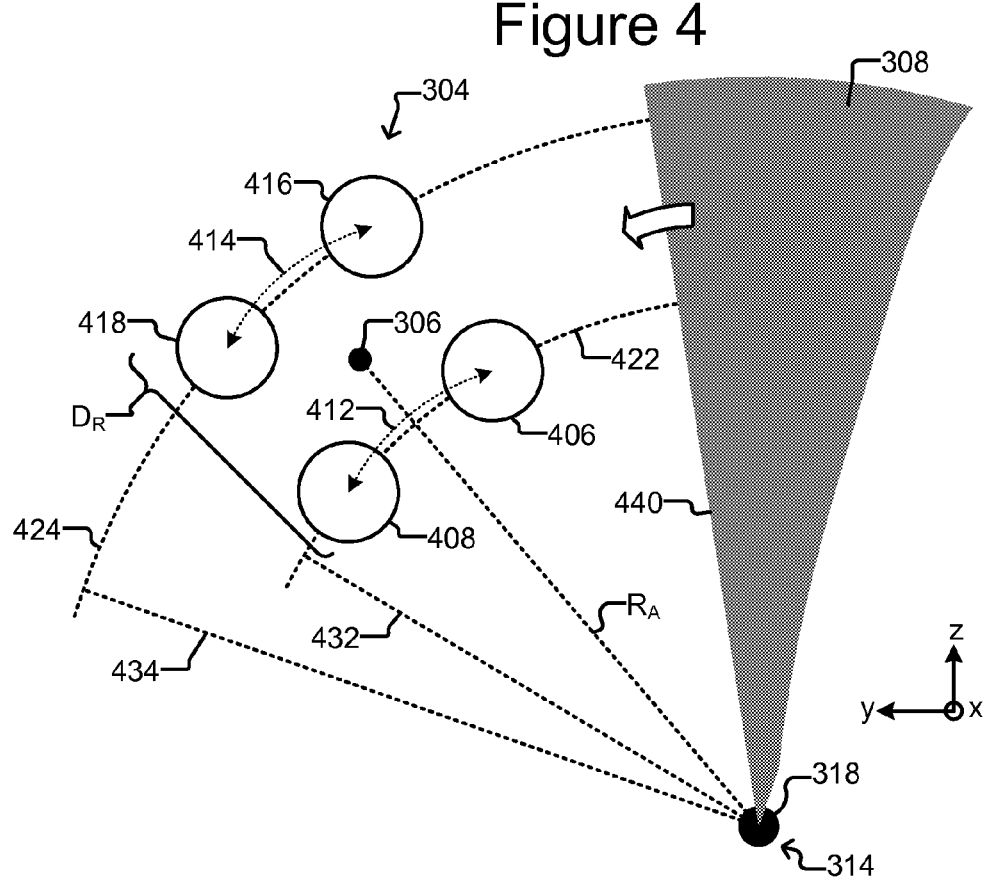
FIG. 4 illustrates an example configuration of the receive antenna array of FIG. 3A according to some embodiments of the invention.

FIG. 4 illustrates an example configuration of the receive antenna array 304. As shown, the array 304 can comprise a plurality of receive antennas 406, 408, 416, 418 (four are shown but there can be fewer or more). Although the antennas 406, 408, 416, 418 can be disposed in any pattern, in the example shown in FIG. 4, receive antennas 406, 408 are located a distance 412 apart on a first circumference 422 of a circle having a radius 432 and centered at the center point 318 of the far field 316. For example, the centers of the antennas 406, 408 can be located on the first circumference 422, and the distance 412 can be the distance on the circumference 422 between the centers of the antennas 406, 408. Similarly, in the example shown in FIG. 4, receive antennas 416, 418 are located a distance 414 apart on another circumference 424 of a circle having a radius 434 and centered at the center point 318 of the far field 316. For example, the centers of the antennas 416, 418 can be located on a circumference 424, and the distance 414 can be the distance on the circumference 424 between the centers of the antennas 416, 418. In some embodiments, the receive antennas 406, 408 can be an example of a first pair of antennas, and the receive antennas 416, 418 can be an example of a second pair of antennas.

Examples of other patterns of the receive antennas 406, 408, 416, 418 in the receive array 304 include three or four of the antennas 406, 408, 416, 418 being located on the same circumference (e.g., 424) and being spaced a known distance apart on the circumference. The foregoing and many other patterns are possible.

FIG. 4 shows a partial view of the composite OAM beam 308. In the example shown in FIG. 4, the wave front 440 of the composite OAM beam 308 twists counter clockwise about the propagation axis 314 as the beam 308 propagations along the axis 314 (which is into the page in FIG. 4). Because the composite OAM beam 308 twists about the propagation axis 314 as the beam 308 moves along the axis 314, there will be phase differences between the beam 308 as detected at the receive antennas 406, 408, 416, 418. Utilizing those phase differences and the locations of the receive antennas 406, 408, 416, 418 with respect to each other and the axis 314, the modes of each of the individual OAM signals 309, 310, 311, 313 (see FIG. 3A) of the composite OAM beam 308 can be identified and the beam 308 resolved. For example, in the example shown in FIG. 4, the following can be used to resolve the composite OAM beam 308 into the individual OAM signals 309, 310, 311, 313: a first phase difference between the beam 308 as detected at the receive antennas 406, 408 on the circumference 422; a second phase difference between the beam 308 as detected at the receive antennas 416, 418 on the circumference 424; the distances 432, 434 from the center point 318 to the circumferences 422, 424; and the distances 412, 414 between the receive antennas 406, 408, 416, 418.

Thus, signals from the receive antennas 406, 408, 416, 418 as those antennas sense the composite OAM beam 308 can be utilized to identify and separate each individual OAM signal 309, 310, 311, 313 in the composite OAM beam 308. (Identifying and separating the individual OAM signals 309, 310, 311, 313 in a composite OAM beam 308 are sometimes referred to herein as "resolving" the composite OAM beam 308.) In some embodiments, such signals from $N_{RA}$ receive antennas can be sufficient to identify and separate each of M individual OAM signals 309, 310, 311, 313 in the beam 308. (As noted above, there can be fewer or more than four individual OAM signals 309, 310, 311, 313 in the composite OAM beam 308.)

Generally as noted, the Rayleigh range R of a multichannel communications system can be proportional or even equal to the product of the distance $D_T$ across the transmit antenna 304 and the distance $D_R$ across the receive antenna array 304 divided by the wavelength λ of the center frequency of the frequency band in which the signals are transmitted. That is: $R=(D_T*D_R)/\lambda$. Thus, as long as the distance D between the OAM transmit antenna 302 and the receive antenna array 304 is less than or equal to the foregoing Rayleigh range R, the composite OAM beam 308 can be resolved into the individual OAM signals 309, 310, 311, 313 with substantial certainty. The distance $D_R$ across the receive array 304 can be, for example, the longest distance between any two of the antennas in the array 304. Regardless, the distance $R_A$ can be greater than (e.g., two times, three times, five times, or more) than the distance $D_R$. The distance $D_T$ can be the diameter of or distance across the transmit antenna 302. If the transmit antenna 302 is an array of antennas, the distance $D_T$ can be similar to one or more of the distances described above for distance $D_R$.

Because the communications system 300 of FIG. 3A is an OAM system, the Rayleigh range R of the system 300 can also be determined in terms of angular resolution. For example, the Poynting vectors of each of the M individual OAM signals 309, 310, 311, 313 of the composite OAM beam 308 can have a pitch angle $\alpha_m$ from the propagation axis 314 as follows: $\alpha_m=\arctan(\lambda*m/2\pi*R_A)$, where $\alpha_m$ is the pitch angle of the individual OAM signal 309, 310, 311, 313 having an OAM mode m (wherein m can be any integer between one and M (inclusive)), arctan is the arctangent trigonometric function, λ is the wavelength of the OAM beam 308, π is the number pi, and $R_A$ is as illustrated in FIGS. 3A and 3B and discussed above. The pitch angle $\alpha_m$ of each individual OAM signal 309, 310, 311, 313 can be determined with substantial certainty as long as the uncertainty of the integer value of the mode m of each individual OAM signal 309, 310, 311, 313 is less than one half: $\Delta m<\frac{1}{2}$, where $\Delta m$ is the uncertainty of m.

The uncertainty of the mode m can be expressed mathematically as follows: $\Delta m = R_A * \Delta\phi/D_R$, where $\Delta\phi$ is angular resolution in radians and $R_A$ and $D_R$ are as illustrated in FIG. 3A and discussed above. The angular resolution $\Delta\phi$ can be as follows: $\Delta\phi = \arcsin(1.22*\lambda/D_R)$, where arcsin is the arcsin trigonometric function and $\lambda$ and $D_R$ are as noted above. The foregoing leads to the following mathematical relationship: $\Delta m = (R_A * \arcsin(1.22*/\lambda D_R))/D_R$, where the elements of the foregoing formula are as noted above. Specific values of $R_A$ and $D_R$ for the OAM communications system 300 of FIG. 3A can be selected so that $\Delta m$ is less than one half.

Figure 5:
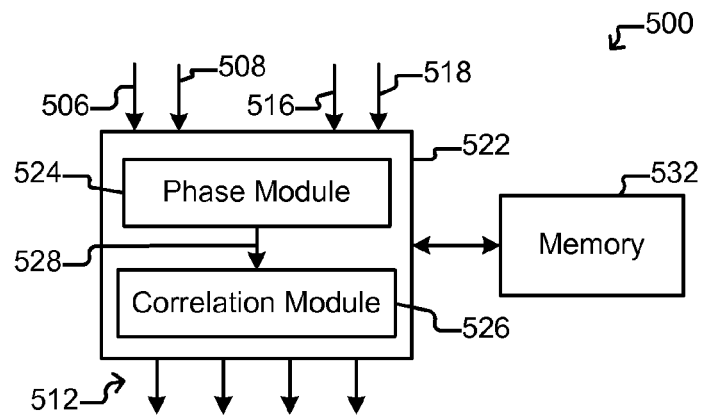
FIG. 5 is an example of a processing module for resolving a composite OAM beam into its individual OAM signals according to some embodiments of the invention.

FIG. 5 illustrates an example of a processing module 500 for receiving signals from the receive antennas 406, 408, 416, 418 of the receive antenna array 304 and resolving the composite OAM beam 308. As will be seen, inputs 506, 508, 516, 518 of the processing module 500 can be connected to the receive antennas 406, 408, 416, 418 of the receive array 304.

As shown in FIG. 5, the processing module 500 can comprise a signal separator 522 and a digital memory device 532. The signal separator 522 (including any module (e.g. the phase module 524 and/or the correlation module 526) or portion of the signal separator 522) can, for example, comprise a computing device (e.g., a computer, a microprocessor, or the like) configured to operate in accordance with machine executable instructions (e.g., software, firmware, microcode, or the like) stored in the memory device 532. Alternatively, the signal separator 522 can comprise hardwired electric circuits (e.g., digital and/or analog circuits). As yet another alternative, the signal separator 522 can comprise a combination of a computing device configured to operate in accordance with machine executable instructions stored in the memory device 532 and hardwired electric circuits.

The digital memory device 532 can comprise any storage device for storing digital data. Examples of the digital memory device 532 include semiconductor based memory devices, magnetic memory devices, optical memory devices, or the like, or any combination of the foregoing. In addition to storing machine executable instructions mentioned above, the digital memory device 532 can also store digital data tables correlating phase difference data for the receive antennas 406, 408, 416, 418 to corresponding OAM modes of the individual OAM signals 309, 310, 311, 313 of the composite OAM beam 308.

As illustrated in FIG. 5, the signal separator 522 can have a plurality of signal inputs 506, 508, 516, 518 each of which can correspond to one of the receive antenna 406, 408, 416, 418. For example, in the example illustrated in FIGS. 4 and 5, the antennas 406, 408 can be connected, respectively, to the signal inputs 506, 508, and the antennas 416, 418 can be connected to the signal inputs 516, 518. The receive array 304 can thus provide to the inputs 506, 508, 516, 518 signals each corresponding to simultaneous detection of the composite OAM beam 308 at one of the receive antennas 406, 408, 416, 418 in the receive array 304.

As also illustrated in FIG. 5, the signal separator 522 can comprise outputs 512. For example, there can be an output 512 for each of the individual OAM signals 309, 310, 311, 313 of the composite OAM beam 308. It can be possible to resolve as many different OAM signals 309, 310, 311, 313 each with a different OAM mode in the composite OAM beam 308 as there are antennas 406, 408, 416, 418 in the receive array 304. In some embodiments, however, the number of OAM signals 309, 310, 311, 313 can be one less than the number of antennas 406, 408, 416, 418 in the receive array 304.

The signal separator 522 can utilize the signals received at the inputs 506, 508, 516, 518 from the receive antenna array 304 to resolve the composite OAM beam 308 detected at the array 304 into the individual OAM signals 309, 310, 311, 313, which the signal separator 522 can provide at outputs 512. As shown in FIG. 5, the signal separator 522 can comprise a phase module 524 and a correlation module 526. The phase module 524 can determine a phase difference between signals received at the inputs 506, 508, 516, 518 from the receive antennas 406, 408, 416, 418. The phase module 524 can provide the phase differences as input 528 (one is shown but there can be more) to the correlation module 526, which can utilize the phase differences to resolve the combined OAM beam 308 into the individual OAM signals 309, 310, 311, 313.

FIG. 6 illustrates an example of a process 600 for resolving a composite OAM beam into its individual OAM signals. For ease of illustration and discussion, the process 600 is illustrated and discussed herein as performed by the OAM communications system 300 of FIGS. 3A-4 and the processing module 500 shown in FIG. 5 on the composite OAM beam 308. The process 600 is not, however, so limited.

As shown, at step 602, the process 600 can receive a composite OAM beam comprising M individual OAM signals, where as discussed above, M is an integer greater than one. For example, the composite OAM signal 308 comprising individual OAM signals 309, 310, 311, 313 can be transmitted from the transmit antenna 302 and received, at step 602, at the receive antenna array 304.

At step 604, the process 600 can resolve the composite OAM beam received at step 602 into its individual OAM signals. For example, the signal separator 522 of FIG. 5 can simultaneously latch signals at its inputs 506, 508, 516, 518 from corresponding receive antennas 406, 408, 416, 418 of the receive antenna array 304. The latched signals can correspond to simultaneous detection of the composite OAM beam 308 at the antennas 406, 408, 416, 418. The signal separator 522 can utilize the latched signals to resolve the composite OAM 308 beam into the individual OAM signals 309, 310, 311, 313.

Process 608 (comprising steps 610-616 in FIG. 6) is an example of a process for performing step 604. The process 608, however, is but an example, and step 604 can be performed in other ways.

As shown in FIG. 6, at step 610, the process 608 can determine a first phase difference between signals received from the receive antennas. For example, at step 610, the process 608 can determine a first phase difference between two signals corresponding to the simultaneous sensing of the composite OAM beam 308 at two of the receive antennas 406, 408, 416, 418. For example, the process 608 can determine the first phase difference between signals received from the antennas 406, 408 (which can be an example of a first pair of receive antennas). The phase module 524 in FIG. 5 can determine the first phase difference between those signals. The phase module 524 of FIG. 5 can thus perform step 610.

At step 612, the process 608 can correlate the first phase difference determined at step 610 to the OAM modes of one, two, or more of the individual OAM signals of the composite OAM beam received at step 602. For example, if the process 600 at step 612 determined the first phase difference between signals from the receive antennas 406, 408, the process 608 can utilize the first phase difference determined at step 610, the distance 412 between the receive antennas 406, 408, and the radius 432 (which corresponds to the distance of the receive antennas 406, 408 from the center point 318 and thus the axis of propagation 314) to the receive antennas 406, 408 to calculate or estimate the modes of a first and a second of the individual OAM signals (e.g., 309 and 311) of the composite OAM beam 308. Alternatively, at step 612, the process 608 can utilize digital tables stored in the memory device 532 to correlate the first phase difference determined at step 610 to the modes of the first and second individual OAM signals (e.g., 309 and 311) of the composite OAM beam 308 detected at the receive array 304. For example, one or more digital tables correlating ranges of phase differences between signals received at the receive antennas 406, 408, 416, 418 to the possible modes of individual OAM signals 309, 311, 312, 313 can be stored in the memory device 532. At step 612, the process 608 can find the range or ranges in such tables into which the first phase difference falls and identify the corresponding mode or modes as the modes of the first and second individual OAM signals. Regardless of how step 612 is performed, step 612 can be performed by the correlation module 526 of FIG. 5.

At step 614, the process 608 can determine a kth (where k can be an integer between two and one less than the number $N_{RA}$ of receive antennas in the receive array 304 inclusive) phase difference between signals received from the receive antenna array 304. For example, at step 614, the process 608 can determine a kth phase difference between signals corresponding to the simultaneous sensing of the composite OAM beam 308 at each of the receive antennas 416, 418. Those signals can be received from the antennas 416, 418 at the inputs 516, 518, and the phase module 524 of FIG. 5 can determine the kth phase difference between those signals. For example, the process 608 can determine the second phase difference between signals received from the antennas 416, 418 (which can be an example of a second pair of receive antennas). As another example, the process 608 can determine the second phase difference between signals received from one of the antennas 406, 408 (e.g., 406) and one of the antennas 416, 418 (418), and those antennas (e.g., 406, 418) can be an example of a second pair of receive antennas. Regardless, the phase module 524 of FIG. 5 can perform step 614.

At step 616, the process 608 can correlate the kth phase difference determined at step 614 to the mode of an mth (where m is an integer between one and the number M of OAM modes) one of the individual OAM signals of the composite OAM beam received at step 602. Step 616 can be performed generally the same as step 612. In some embodiments, k can be one less than m: k=m−1

For example, if the process 608 at step 614 determined the kth phase difference between signals from the receive antennas 416, 418, at step 616, the process 608 can utilize the kth phase difference determined at step 614, the distance 414 between the receive antennas 416, 418, and the radius to the receive antennas 416, 418 to calculate or estimate the mode of an mth individual OAM signal (e.g., 310) of the composite OAM beam 308. As another example, the process 608, at step 616, can utilize a digital table stored in the memory device 532 to correlate the kth phase difference determined at step 614 to the mode of an mth one of the OAM signal (e.g., 310), which can be performed generally as discussed above with respect to step 612. Regardless of how step 616 is performed, step 616 can be performed by the correlation module 526 of FIG. 5.

The process 608 can repeat steps 614 and 616 for every value of k between two and M−1 inclusive, where M is the number of OAM modes.

The process 608 is but an example. For example, steps 610 and 614 can be performed sequentially as shown or, alternatively, substantially simultaneously. Similarly, steps 612 and 616 can be performed sequentially as shown or, alternatively, substantially simultaneously. Moreover, process 608 can include fewer or additional steps.

Regardless of how step 604 is performed, after steps 602 and 604, the process 600 has resolved the composite OAM beam 308 into the individual OAM signals 309, 310, 311, 313. That is, the individual OAM signals 309, 310, 311, 313 have been identified by their modes and separated. At step 606, the process 600 can output each individual OAM signal 309, 310, 311, 313 at the output 512 that corresponds to the mode of the signal 309, 310, 311, 313. Step 606 can be performed by the signal separator 522 of FIG. 5. Thereafter, each individual OAM signal 309, 310, 311, 313 can be further demodulated and further processed to decode the data in the signal 309, 310, 311, 313.

The process 600 is but an example and variations are contemplated. For example, process 600 can include fewer or additional steps.

Figure 7A:
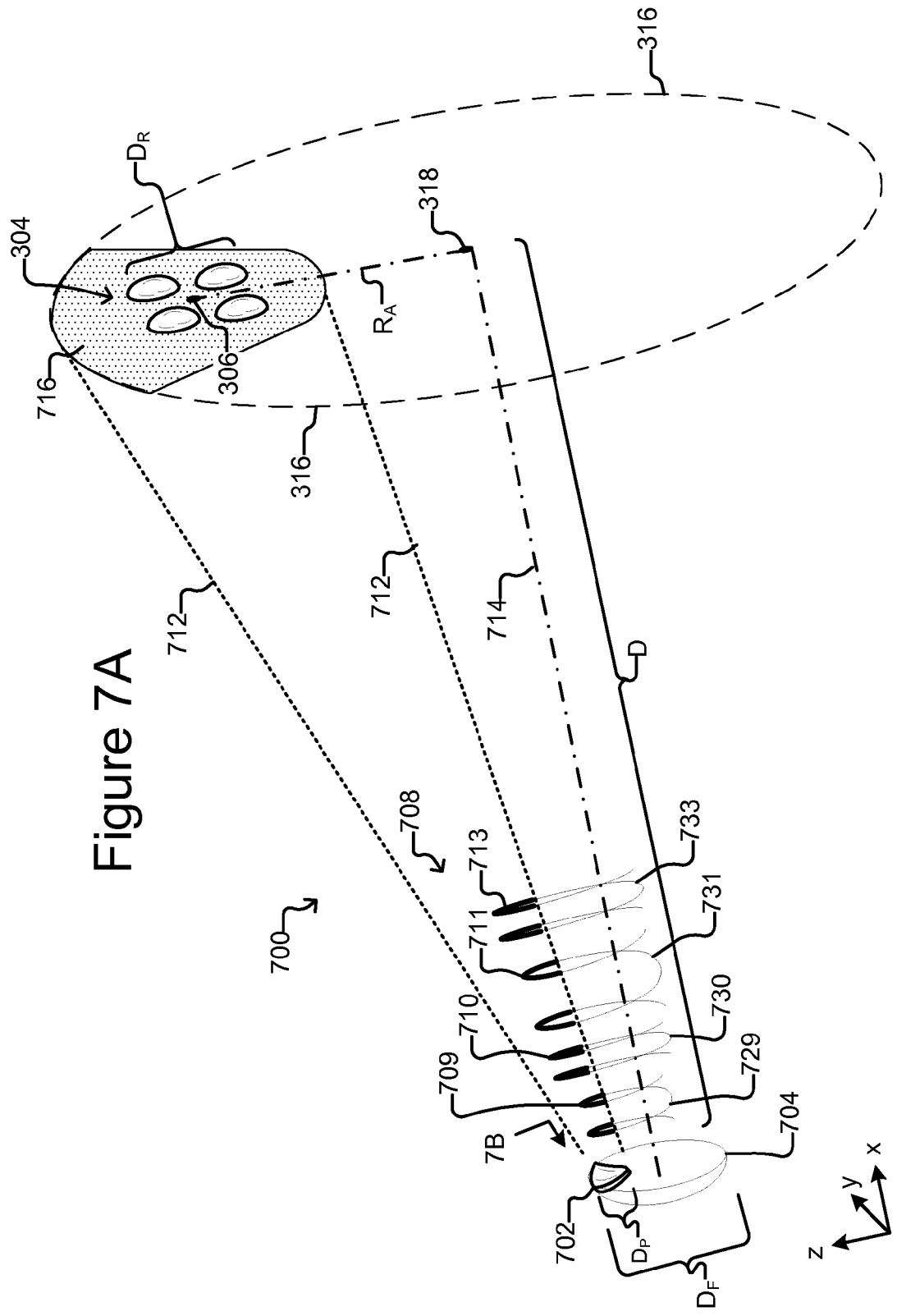
FIG. 7A illustrates an example of a partial-beam OAM transmit antenna and a receive antenna array for a partial-beam OAM communications system according to some embodiments of the invention.

FIG. 7A illustrates examples of a partial-beam OAM transmit antenna 702 and an array 304 of receive antennas in a partial-beam OAM communications system 700. Although not shown, an RF transmitter can drive RF signals to the transmit antenna 702, and an RF receiver (not shown) can be connected to the receive antenna array 304. Although illustrated as one antenna, the transmit antenna 702 can instead comprise a plurality of such antennas.

The partial-beam OAM communications system 700 can be generally similar to the OAM communications system 300 (see FIG. 3A) and like numbered elements can be the same. In the partial-beam OAM communications 700, however, a partial-beam OAM transmit antenna 702 can replace the OAM transmit antenna 302 of FIG. 3A. The partial-beam OAM transmit antenna 702 can be generally similar to the OAM transmit antenna 302 of FIG. 3A except that the partial-beam OAM transmit antenna 702 transmits a composite partial-beam OAM beam 708 comprising partial-beam OAM signals 709, 710, 711, 713 (four are shown but there can be fewer or more as discussed below).

That is, while each OAM signal 309, 310, 311, 313 in FIG. 3A is depicted as a full OAM signal, each of the OAM signals 709, 710, 711, 713 in FIG. 7A is a partial-beam OAM signal. As illustrated in FIG. 7A, the partial-beam OAM signal 709 is only a portion of what would otherwise be a full OAM signal (compare to the OAM signal 309 in FIG. 3A) that twists about a propagation axis 714 (which can be the same as the propagation axis 314 in FIG. 3A) as it propagates along the axis 714. The missing portion of what would otherwise be the full OAM signal corresponding to the partial-beam OAM signal 709 is shown in dashed lines in FIG. 7A and labeled 729. Partial-beam OAM signals 710, 711, 713 are similarly partial-beam OAM signals that are, respectively, only a portion of what would otherwise be full OAM signals (compare to OAM signals 310, 311 in FIG. 3A) that twist about the propagation axis 714 as they propagate along the axis 714. The missing portions of what would otherwise be the full OAM signals corresponding to the partial-beam OAM signals 710, 711, 713 are shown in dashed lines in FIG. 7A and labeled 730, 731, 733 respectively.

Otherwise, the partial composite OAM beam 708 can be generally similar to the composite OAM beam 308 of FIG. 3A. For example, the composite partial-beam OAM beam 702 can comprise M individual partial-beam OAM signals 709, 710, 711, 713 in the same frequency band, where M is an integer greater than one. Thus, although the composite partial-beam OAM beam 708 is illustrated in FIG. 7A as comprising four individual partial-beam OAM signals 709, 710, 711, 713, the partial-beam OAM beam 708 can comprise fewer or more of such individual partial-beam OAM signals.

Each individual partial-beam OAM signal 709, 710, 711, 713 can be a modulated RF signal carrying data, and each individual partial-beam OAM signal 709, 710, 711, 713 can have a different OAM mode. For example, the mode of each individual partial-beam OAM signal 709, 710, 711, 713 can be a unique integer (e.g., no two of the modes of the M individual partial-beam OAM signals 709, 710, 711, 713 have the same absolute value and sign).

As OAM type signals, each individual partial-beam OAM signal 709, 710, 711, 713—and thus also the composite partial-beam OAM beam 708—twists about a propagation axis 714 as the signals 709, 710, 711, 713 propagate along the axis 714. For example, as illustrated in FIG. 7A, the propagation axis 714 can be parallel to the x axis in an x, y, z coordinate system. As is known, RF signals, such as the composite OAM beam 308, spread out as they propagate. The spreading of the composite partial-beam OAM beam 708 as it propagates along the axis 714 is illustrated, in exaggerated fashion, by 712 in FIG. 7A. An outline of a far field 716 of the composite partial-beam OAM beam 708 a distance D from the transmit antenna 702 is also shown in FIG. 7A. As shown, the far field 716 can correspond to a portion of the far field 316 of a full OAM beam (like beam 308 in FIG. 3A). (The full OAM far field 316, corresponding to a circle centered at center point 318 where the propagation axis 714 intersects the far field 316, is shown in FIG. 7A for comparison.) That is, the far field 716 can correspond to substantially the same portion of the full far field 316 as the partial-beam OAM signals 709, 710, 711, 713 correspond to full OAM signals (that include the missing portions 729, 730, 731).

As illustrated in FIG. 7A, each partial-beam OAM signal 709, 710, 711, 713 of the composite partial-beam OAM beam 708 constitutes less than all of what would otherwise be a full corresponding OAM beam. The partial-beam OAM signal 709 can be, for example, less than fifty percent, less than forty percent, less than thirty percent, or less than twenty percent of the combination of the signal 709 and its missing portion 729. The partial-beam OAM signals 710 can similarly be, for example, less than fifty percent, less than forty percent, less than thirty percent, or less than twenty percent of the combination of the signal 710 and its missing portion 730, and the partial-beam OAM signals 711 can similarly be less than fifty percent, less than forty percent, less than thirty percent, or less than twenty percent of the combination of the signal 711 and its missing portion 731. Likewise, the partial-beam OAM signal 713 can similarly be less than fifty percent, less than forty percent, less than thirty percent, or less than twenty percent of the combination of the signal 713 and its missing portion 733.

The far field 716 of the composite partial-beam OAM beam 708 can constitute substantially the same percentage of the far field 316 of a full OAM beam (e.g., like 308 of FIG. 3A) as the percentage that the individual partial-beam OAM signals 709, 710, 711, 713 constitute of their corresponding full OAM versions (signal 709 and its missing portion 729, signal 710 and its missing portion 730, signal 711 and its missing portion 731, signal 713 and its missing portion 733). The far field 716 of the partial-beam OAM beam 708 can thus be, for example, less than fifty percent, less than forty percent, less than thirty percent, or less than twenty percent of the far field 316.

As shown in FIG. 7A, the receive antenna array 304 can be located entirely in the far field 716. Otherwise, the array 304 can be located generally as illustrated in FIGS. 3A-4 and discussed above. For example, although not shown in FIG. 7A, the array 304 can be located entirely within a sector (e.g., like 322) of the full far field 316 as illustrated in FIG. 3B and discussed above. As another example, and as shown in FIG. 7A, the array 304 can be located the distance $R_A$ from the center point 318 of the full far field 316 and the propagation axis 714. The distance $R_A$ can be, as illustrated in FIG. 3B, from the center point 318 of the far field 316 to the point 306 substantially at the center of the array 304. As an alternative example, the distance $R_A$ can be from the center point 318 to the antenna in the array 304 that is closest to the center point 318.

The composite partial-beam OAM beam 708 can be received at the receive antenna array 304 and resolved into the individual partial-beam OAM signals 709, 710, 711, 713 in any of the ways discussed above for receiving the composite OAM beam 308 at the array 304 and resolving the received beam 308 into the individual OAM signals 309, 310, 311, 313. For example, the processing module 500 can be configured and operate on signals received at the inputs 506, 508, 516, 518 from the array 304 in any of the ways discussed above. As another example, the process 600 can operate to receive the composite partial-beam OAM beam 708 and resolve it into the individual partial-beam OAM signals 709, 710, 711, 713 in any of the ways discussed above.

The partial-beam OAM transmit antenna 702 can comprise a portion of a full OAM transmit antenna (e.g., like the transmit antenna 302 of FIG. 3A). A full OAM transmit antenna is labeled 704 and can be like the OAM transmit antenna 302 of FIG. 3A, including any variation or embodiments discussed above.

For example, as noted above, the transmit antenna 302 of FIG. 3A of the present application can be like the antenna system 300 illustrated in FIG. 3 of U.S. patent application Ser. No. 14/077,493 (hereinafter the '493 Application). The transmit antenna 702 of FIG. 7A of the present application can similarly be like the antenna system 300 illustrated in FIG. 3 of the '493 Application, except that the OAM device 404 can be a partial-beam OAM device rather than a full OAM device. For example, if each of the OAM feeds 310 in FIG. 3 of the '493 Application is configured like the OAM feed horn 700 of FIG. 7, the OAM lens 600 in FIG. 6A of the '493 Application can be a partial lens having a partial-beam OAM surface that corresponds to only a cutout of the OAM surface 602. As another example, if each of the OAM feeds 310 in FIG. 3 of the '493 Application is configured like the OAM feed 800 of FIG. 8, the OAM surface 802 can be a partial surface that corresponds to only a cutout of the OAM surface 802.

As another example, the partial-beam OAM transmit antenna 702 of FIG. 7A of the present application can comprise multiple partial-beam OAM transmit antennas (e.g., one for each of the M individual OAM signals 709, 710, 711, 713 in the composite OAM beam 708) each for transmitting one of the individual OAM signals 709, 710, 711, 713. For example, the transmit antenna 702 can comprise $N_{RA}$ partial-beam OAM antennas like the partial-beam OAM antenna 204 in FIG. 3A of the aforementioned U.S. patent application Ser. No. 14/077,433. As discussed in U.S. patent application Ser. No. 14/077,433, each such partial-beam OAM antenna can comprise a reflective surface that is a cutout of a full OAM surface. Each such OAM antenna can be configured to impart a different OAM mode to an incident signal, and each OAM antenna can be pointed at the center point 318 of the fair field 316.

Figure 7B:
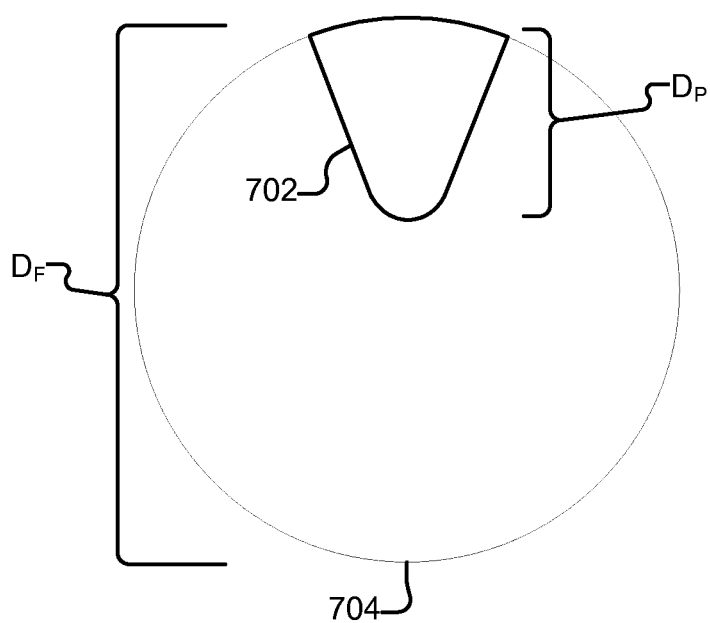
FIG. 7B is a front view of the partial-beam OAM transmit antenna array of FIG. 7A.

The partial-beam OAM communications system 700 of FIG. 7 of the present application can provide a number of advantages. For example, for a given power level at which signals are driven to the transmit antenna 702, the intensity level of each of the partial-beam OAM signals 709, 710, 711, 713 can be greater than the intensity level would be of corresponding full OAM signals. This is because the full intensity level of what would otherwise be in the combination of the partial-beam OAM signals 709, 710, 711, 713 and their respective missing portions 729, 730, 731 is substantially concentrated in the partial-beam OAM signals 709, 710, 711, 713. The partial-beam OAM signal 709 thus includes not only the intensity level corresponding to its portion of a full OAM signal but also substantially includes the intensity level of the missing portion 729. The partial-beam OAM signals 710, 711 similarly include substantially the intensity level of their missing portions 730, 731.

Indeed, if the partial-beam OAM signals 709, 710, 711, 713 are, for example, fifty percent of their corresponding full OAM signals, the intensity level of each of the partial-beam OAM signals 709, 710, 711, 713 can be substantially two times the intensity of the corresponding full OAM signals. As another example, if the partial-beam OAM signals 709, 710, 711, 713 are a third of their corresponding full OAM signals, the intensity level of each of the partial-beam OAM signals 709, 710, 711, 713 can be substantially three times the intensity of the corresponding full OAM signals. As yet another example, if the partial-beam OAM signals 709, 710, 711, 713 are twenty-five percent of their corresponding full OAM signals, the intensity level of each of the partial-beam OAM signals 709, 710, 711, 713 can be substantially four times the intensity of the corresponding full OAM signals. The foregoing increase in intensity level, by itself, means that the distance D between a partial-beam OAM transmit antenna 702 (see FIG. 7A) and the receive array 304 can be greater than the distance D between a full OAM transmit antenna 302 (see FIG. 3A) and the receive array 304.

Although specific embodiments and applications of the invention have been described in this specification, these embodiments and applications are exemplary only, and many variations are possible.

We claim:

1. A process for resolving a composite orbital angular momentum (OAM) beam comprising multiple OAM signals each having a different one of a plurality of unique OAM modes, said process comprising:
   receiving at an antenna array comprising a plurality of receive antennas said composite OAM beam propagating along an axis, wherein said antenna array is locate a distance $R_A$ from said axis; and
   separating said OAM beam into said OAM signals utilizing a first phase difference of said composite OAM beam as received at ones of said receive antennas.

2. The process of claim 1, wherein said antenna array is located entirely within a sector of a circle centered at said axis and having a radius sufficiently greater than $R_A$ to encompass said antenna array.

3. The process of claim 2, wherein said sector is less than half of said circle.

4. The process of claim 2, wherein said sector is less than one quarter of said circle.

5. The process of claim 2, wherein said distance $R_A$ is at least two times greater than a distance across said antenna array.

6. The process of claim 1, where said separating comprises determining said first phase difference from signals generated by said receive antennas that correspond to detection of said composite OAM beam at said receive antennas.

7. The process of claim 6, wherein said separating further comprises correlating said first phase difference to one of said unique OAM modes.

8. The process of claim 7, wherein said correlating comprises finding in a digital memory device a phase data entry that corresponds to said first phase difference.

9. The process of claim 8, wherein said separating said OAM beam further comprising:
   determining a second phase difference from said signals generated by said receive antennas that correspond to detection of said composite OAM beam at said receive antennas, and
   correlating said second phase difference to another of said unique OAM modes.

10. The process of claim 9, wherein said correlating said second phase difference comprises finding in said digital memory device a phase data entry that corresponds to said second phase difference.

11. The process of claim 1, wherein:
   said first phase difference is a phase difference of said composite beam as received at a first pair of said receive antennas, and
   said separating comprises:
      identifying said OAM modes of two of said OAM signals of said composite OAM beam utilizing said phase difference of said composite beam as received at said first pair of receive antennas, and
      determining a second phase difference of said composite beam as received at a second pair of said receive antennas, and
      identifying said OAM mode of another of said OAM signals of said composite OAM beam utilizing said second phase difference of said composite beam as received at said second pair of receive antennas.

12. The process of claim 11, wherein antennas of said first pair of receive antennas are disposed a first distance apart on an arc of a first circle having a first radius and centered at said axis.

13. The process of claim 12, wherein:
   antennas of said second pair of receive antennas are disposed a second distance apart on an arc of a second circle having a second radius and centered at said axis, and
   said second radius is different than said first radius.

14. The process of claim 1, wherein each of said OAM signals of said composite OAM beam is a partial-beam OAM signal that corresponds to less than all of a corresponding full OAM signal.

15. The process of claim 1 further comprising transmitting from a partial-beam OAM transmit antenna at least one of said partial-beam OAM signals, wherein said partial-beam OAM transmit antenna corresponds to a cutout from a full OAM transmit antenna for transmitting said corresponding full OAM signal of said at least one of said partial-beam OAM signals.

16. The process of claim 15, wherein a Rayleigh range between said partial-beam OAM transmit antenna and said antenna array is greater than a Rayleigh range between said full OAM transmit antenna and said antenna array.

17. The process of claim 15, wherein a size of said full OAM transmit antenna is at least two times greater than a size of said partial-beam OAM transmit antenna.

18. An orbital angular momentum (OAM) communications system comprising:
   a transmit antenna configured to transmit along a propagation axis at least one OAM signal of a composite OAM beam comprising M OAM signals, each said OAM signal having a different one of a plurality of unique OAM modes, where M is greater than one;

an antenna array comprising $N_{RA}$ receive antennas, wherein said antenna array is disposed a distance $R_A$ from said propagation axis; and a signal separator configured to:

receive input signals from said receive antennas that correspond to detection of said composite OAM beam at said receive antennas, and separate said OAM beam into said OAM signals utilizing a first phase difference between ones of said input signals.

19. The system of claim 18, wherein said antenna array is disposed entirely within a sector of a circle centered at said propagation axis and having a radius $R_C$ sufficiently greater than $R_A$ to encompass said antenna array.

20. The system of claim 19, wherein said sector is less than half of said circle.

21. The system of claim 19, wherein said sector is less than one quarter of said circle.

22. The system of claim 19, wherein said distance $R_A$ is at least two times a distance across said antenna array.

23. The system of claim 18, wherein said signal separator comprises a phase module configured to determine said first phase difference from ones of said input signals received from a first pair of said receive antennas.

24. The system of claim 23, wherein said signal separator further comprises a correlation module configured to correlate said first phase difference to at least one of said unique OAM modes.

25. The system of claim 24 further comprising a digital memory device in which are stored phase data entries each corresponding to a different one of said unique OAM modes.

26. The system of claim 24, wherein:

said phase module is further configured to determine a second phase difference from ones of said input signals received from a second pair of said receive antennas, and said correlation module is further configured to correlate said second phase difference to another one of said unique OAM modes.

27. The system of claim 26, wherein:

antennas of said first pair of said receive antennas are disposed a first distance apart on an arc of a first circle having a first radius and centered at said propagation axis, and antennas of said second pair of said receive antennas are disposed a second distance apart on an arc of a second circle having a second radius and centered at said propagation axis, wherein said second radius is different than said first radius.

28. The system of claim 18, wherein said signal separator is further configured to separate said OAM beam into said OAM signals further utilizing a second phase difference between ones of said input signals.

29. The system of claim 18, wherein said transmit antenna is a partial-beam OAM transmit antenna configured to transmit said at least one of said OAM signals as a partial-beam OAM signal that corresponds to less than a full OAM version of said at least OAM signal.

30. The system of claim 29, wherein said partial-beam OAM transmit antenna corresponds to a cutout of a full OAM transmit antenna for transmitting said full OAM version of said at least one of said OAM signals.

31. The system of claim 30, wherein a Rayleigh range between said partial-beam OAM transmit antenna and said antenna array is greater than a Rayleigh range between said full OAM transmit antenna and said antenna array.

* * * * *